United States Patent
Chantry et al.

(10) Patent No.: US 11,931,832 B2
(45) Date of Patent: Mar. 19, 2024

(54) WELDING SYSTEM WITH WIRE ELECTRODE CONTACT DETECTION

(71) Applicant: Lincoln Global, Inc., Santa Fe Springs, CA (US)

(72) Inventors: Bruce J. Chantry, Solon, OH (US); Alexander C. Mehlman, Strongsville, OH (US); Edward D. Hillen, Painesville, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 627 days.

(21) Appl. No.: 17/060,240

(22) Filed: Oct. 1, 2020

(65) Prior Publication Data
US 2022/0105585 A1  Apr. 7, 2022

(51) Int. Cl.
*B23K 9/095* (2006.01)
*B23K 9/12* (2006.01)
*B23K 9/133* (2006.01)
*B23K 9/23* (2006.01)
*B23K 37/00* (2006.01)
*B23K 9/09* (2006.01)

(52) U.S. Cl.
CPC ............ *B23K 9/0953* (2013.01); *B23K 9/125* (2013.01); *B23K 9/1336* (2013.01); *B23K 9/23* (2013.01); *B23K 37/006* (2013.01); *B23K 9/09* (2013.01)

(58) Field of Classification Search
CPC .... B23K 9/0953; B23K 9/125; B23K 9/1336; B23K 9/23; B23K 37/006; B23K 9/09
See application file for complete search history.

(56) References Cited

U.S. PATENT DOCUMENTS

| | | | |
|---|---|---|---|
| 4,443,687 A | 4/1984 | Toth | |
| 5,302,805 A | 4/1994 | Morris et al. | |
| 5,916,464 A | 6/1999 | Geiger | |

(Continued)

FOREIGN PATENT DOCUMENTS

| | | |
|---|---|---|
| CN | 203679498 U | 7/2014 |
| DE | 4312224 C1 | 6/1994 |

(Continued)

OTHER PUBLICATIONS

Partial European Search Report from Corresponding Application No. 21200081.4; dated Feb. 17, 2022; pp. 1-12.

*Primary Examiner* — Jimmy Chou
(74) *Attorney, Agent, or Firm* — Brad C. Spencer

(57) ABSTRACT

A welding system includes a power supply configured to generate a welding waveform. A wire feeder conducts the welding waveform to a wire electrode, and includes a drive motor that drives the wire electrode bidirectionally, a motor current sensor that senses a current level of the motor, and a controller that receives a current level signal from the motor current sensor and controls operations of the motor. A welding current sensor senses welding current level, and a welding voltage sensor senses welding voltage level, and the sensors are located with the power supply or the wire feeder. The controller is configured to determine a contact event between the wire electrode and a non-workpiece object based on the current level signal from the motor current sensor and one or both of the welding current level and the welding voltage level, and automatically retract the wire electrode upon determining the contact event.

19 Claims, 7 Drawing Sheets

(56) References Cited

U.S. PATENT DOCUMENTS

| | | | |
|---|---|---|---|
| 7,323,659 B2* | 1/2008 | Ihde | B23K 9/1336 |
| | | | 219/137.71 |
| 8,680,431 B2 | 3/2014 | Stava et al. | |
| 9,931,707 B2 | 4/2018 | Balaster | |
| 10,562,124 B2 | 2/2020 | Hillen et al. | |
| 2006/0138116 A1 | 6/2006 | Lipnevicius | |
| 2007/0262058 A1* | 11/2007 | Ulrich | B23K 9/205 |
| | | | 219/99 |
| 2009/0242534 A1 | 10/2009 | Artelsmair et al. | |
| 2012/0074112 A1* | 3/2012 | Kotera | B23K 9/125 |
| | | | 219/124.1 |
| 2012/0145689 A1* | 6/2012 | Hillen | B23K 9/295 |
| | | | 219/136 |
| 2012/0199566 A1 | 8/2012 | Hillen et al. | |
| 2012/0248080 A1* | 10/2012 | Hutchison | B23K 9/0953 |
| | | | 219/130.21 |
| 2014/0001166 A1* | 1/2014 | Peters | B23K 9/1006 |
| | | | 219/130.1 |
| 2014/0175072 A1* | 6/2014 | Hutchison | B23K 9/095 |
| | | | 219/130.1 |
| 2015/0183045 A1* | 7/2015 | Peters | B23K 35/0261 |
| | | | 219/130.21 |
| 2015/0209889 A1* | 7/2015 | Peters | B22F 10/22 |
| | | | 219/76.14 |
| 2015/0209905 A1* | 7/2015 | Matthews | B23K 9/173 |
| | | | 219/76.14 |
| 2015/0209906 A1* | 7/2015 | Denney | B23K 26/342 |
| | | | 219/76.14 |
| 2015/0209907 A1* | 7/2015 | Narayanan | B23K 9/173 |
| | | | 219/76.14 |
| 2015/0239058 A1* | 8/2015 | Buescher | B23K 9/167 |
| | | | 219/137.31 |
| 2016/0016250 A1* | 1/2016 | Denis | B23K 26/147 |
| | | | 219/130.1 |
| 2016/0089751 A1* | 3/2016 | Batzler | B23K 9/1087 |
| | | | 434/234 |
| 2016/0221105 A1* | 8/2016 | Henry | B23K 9/173 |
| 2017/0021440 A1* | 1/2017 | Balaster | B23K 9/173 |
| 2017/0050258 A1* | 2/2017 | Hillen | B23K 9/1043 |
| 2017/0072499 A1* | 3/2017 | Schartner | B23K 9/0956 |
| 2017/0157693 A1* | 6/2017 | Albrecht | B23K 9/0052 |
| 2017/0355037 A1* | 12/2017 | Brock | B23K 9/173 |
| 2018/0099346 A1* | 4/2018 | Zwayer | B23K 9/125 |
| 2018/0297141 A1* | 10/2018 | Uecker | B23K 9/1093 |
| 2018/0354051 A1* | 12/2018 | Uecker | B23K 9/0953 |
| 2019/0344370 A1* | 11/2019 | Hutchison | B23K 9/091 |
| 2019/0366466 A1* | 12/2019 | Hutchison | B33Y 10/00 |
| 2020/0101551 A1* | 4/2020 | Murakami | B23K 9/126 |
| 2020/0238421 A1* | 7/2020 | Hutchison | B23K 9/1336 |

FOREIGN PATENT DOCUMENTS

| | | |
|---|---|---|
| IN | 02760MU2014 A | 8/2014 |
| JP | S6056481 A | 4/1985 |
| JP | H07167723 A2 | 7/1995 |

\* cited by examiner

WELDING SYSTEM WITH WIRE ELECTRODE CONTACT DETECTION

BACKGROUND OF THE INVENTION

Field of the Invention

The present invention relates to welding systems and systems that utilize welding-type processes, such as additive manufacturing systems, hardfacing systems, and the like, wherein the systems include a wire feeder. In particular, the present invention concerns control of the movements of the wire electrode that is driven by the wire feeder.

Description of Related Art

Example semi-automatic welding processes are gas metal arc welding (GMAW), flux-cored arc welding (FCAW) and metal-cored arc welding (MCAW). In semi-automatic welding, an operator manipulates a welding torch or gun while a wire electrode is fed through the torch and toward a workpiece by a wire feeder. It is the responsibility of the operator to aim the exposed tip of the wire electrode toward the welding zone on the workpiece as the electrode is fed through the torch. If the operator is not careful and the trigger on the torch is activated, the wire electrode can be driven into objects other than the workpiece. This can result in damage to the end of the wire electrode (e.g., bending or kinking), which may have to be corrected by the operator. For example, the operator may have to stop the welding operation and remove the damaged end of the wire electrode, which leads to material waste and loss of productivity. Because the diameter of the wire electrode is small (e.g., 0.030", 0.035", 0.040", 0.045"), it is possible for the electrode to be driven through the operator's clothing and can puncture his skin if the torch is misaimed or accidentally triggered. The wire electrode can sometimes penetrate the heavy welding glove typically worn the operator and can stick his hand or lower arm. Such a puncture may cause a "recordable" injury that is required to be logged and reported to an appropriate authority (e.g., a management body or a governmental agency). It would be desirable to provide a welding system that reduces or minimizes such shortcomings.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding system. The welding system includes a welding power supply configured to generate a welding waveform. A wire feeder is operatively connected to the welding power supply to conduct the welding waveform to a wire electrode. The wire feeder comprises a drive motor that drives the wire electrode bidirectionally, a motor current sensor that senses a current level of the drive motor, and a controller that is operatively connected to the motor current sensor to receive a current level signal from the motor current sensor, and operatively connected to the drive motor to control operations of the drive motor. A welding current sensor senses a welding current level, and the welding current sensor is located with the welding power supply or the wire feeder. A welding voltage sensor senses a welding voltage level, and the welding voltage sensor is located with the welding power supply or the wire feeder. The controller is configured to determine a contact event between the wire electrode and a non-workpiece object based on the current level signal from the motor current sensor and one or both of the welding current level and the welding voltage level, and automatically retract the wire electrode upon determining the contact event between the wire electrode and the non-workpiece object.

In accordance with another aspect of the present invention, provided is a welding system. The welding system includes a welding power supply configured to generate a welding waveform. A wire feeder is operatively connected to the welding power supply to conduct the welding waveform to a wire electrode in a welding circuit. The wire feeder comprises a drive motor that advances the wire electrode through a torch, a motor current sensor that senses a current level of the drive motor, and a controller that is operatively connected to the motor current sensor to receive a current level signal from the motor current sensor, and operatively connected to the drive motor to control operations of the drive motor. A further sensor senses a condition of the welding circuit, and the further sensor is located with the welding power supply or the wire feeder. The controller is configured to discriminate wire electrode contact events with objects electrically connected to the welding power supply from wire electrode contact events with objects electrically insulated from the welding power supply based on the current level signal from the motor current sensor and the sensed condition of the welding circuit, and automatically stop advancement of the wire electrode through the torch upon detecting a wire electrode contact event with an object electrically insulated from the welding power supply.

In accordance with another aspect of the present invention, provided is a welding method. The welding method includes providing a welding system. The welding system comprises a welding power supply configured to generate a welding waveform. A wire feeder is operatively connected to the welding power supply to conduct the welding waveform to a wire electrode. The wire feeder includes a drive motor that drives the wire electrode bidirectionally, and a motor current sensor that senses a current level of the drive motor. A welding current sensor senses a welding current level, and a welding voltage sensor senses a welding voltage level. A contact event between the wire electrode and a non-workpiece object is detected based on the current level signal from the motor current sensor and one or both of the welding current level and the welding voltage level. The drive motor is automatically reversed and the wire electrode retracted upon detecting the contact event between the wire electrode and the non-workpiece object.

In accordance with another aspect of the present invention, provided is a welding system. The welding system includes a welding power supply configured to generate a welding waveform. A wire feeder is operatively connected to the welding power supply to conduct the welding waveform to a wire electrode. The wire feeder comprises a drive motor that advances the wire electrode through a torch. A controller is operatively connected to the drive motor to control operations of the drive motor. An article of clothing generates a signal detectable by the controller. The controller is configured to determine a contact event between the wire electrode and the article of clothing based on said signal, and automatically stop advancement of the wire electrode through the torch upon determining the contact event between the wire electrode and the article of clothing.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
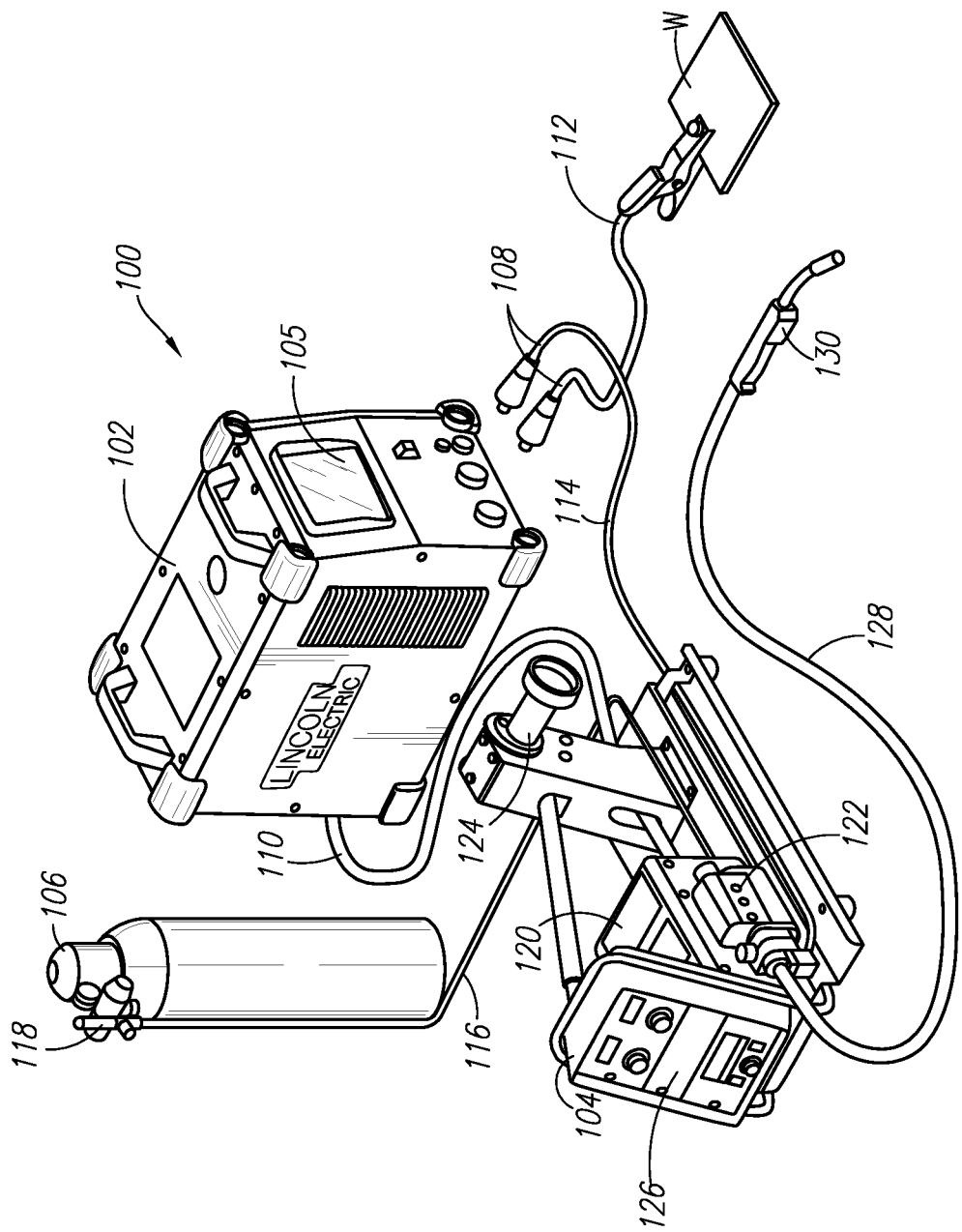
FIG. 1 shows a welding system.

The present invention relates to welding systems and systems that utilize welding-type processes, such as additive manufacturing systems, hardfacing systems, and the like, wherein the systems include a wire feeder. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a single wire, semi-automatic welding system, in particular a GMAW welding system. It is to be appreciated that embodiments of the present invention can be used in similar welding processes, such as FCAW or MCAW welding, and in multi-wire welding processes. In addition to welding operations, embodiments of the present invention can be used in additive manufacturing processes and other welding-type processes, such as hardfacing. Thus, the term "welding" is to be interpreted to include such welding-type processes.

As noted above, it is possible for the operator of a welding system to activate the trigger of the welding torch and begin feeding the wire electrode through the torch before the torch is correctly aimed at the workpiece. This can result in the exposed tip of the wire electrode striking a non-workpiece object, which can damage the tip of the wire electrode. The non-workpiece object could be the operator or the operator's clothing, and the tip of the wire electrode may penetrate the clothing and stick the operator (e.g., in the finger, hand, arm, leg, etc.)

The welding system discussed herein can determine contact events between the wire electrode and other objects. In particular, the welding system can discriminate contact events between the wire electrode and the workpiece, which is electrically connected to the welding system, from contact events between the wire electrode and non-workpiece objects that are electrically insulated from the welding system. When a contact event between the wire electrode and a non-workpiece object is detected, the wire feeder in the welding system will automatically stop feeding the wire electrode and, in certain embodiments, retract the wire electrode.

The welding system can detect contact events involving the wire electrode, whether to the workpiece or a non-workpiece object, from the drive motor current of the wire feeder. Motor torque, and thus motor current level, will increase when the wire electrode strikes an object and the drive motor tries to maintain the wire feed speed determined by the motor's supply voltage. By monitoring the drive motor current during wire feeding, the welding system can detect contact events involving the wire electrode. In example embodiments, the welding system distinguishes contact events between the wire electrode and a workpiece from contact events involving non-workpiece objects by also analyzing the welding voltage and/or current levels. If the wire electrode contacts the workpiece, there will be a detectable drop in welding voltage due to the short circuit, and welding current will flow through the welding electrode to the workpiece. However, if the wire electrode contacts a non-workpiece object that is electrically insulated from the welding system, such as a portion of an operator's welding glove, the welding voltage drop/current flow will not occur.

In certain embodiments, the operator's welding glove or gloves can include a sensor for detecting contact events with the wire electrode, and the sensor generates a contact event signal that is picked up by the welding system. Examples of such sensors include capacitive sensors, voltage sensors, electric field sensors, etc. The gloves could apply a signal to the wire electrode only when a contact event occurs, and the welding system can detect the signal on the electrode and recognize the existence of an undesired contact event. When a contact event between the wire electrode and welding glove is detected/indicated by the glove, the welding system can automatically stop and retract the welding electrode.

Referring now to the drawings, FIG. 1 shows an example welding system 100. The welding system 100 includes welding power supply 102, a wire feeder 104, and a gas supply 106. Welding power supply 102 includes power cables 108, control cable 110, and power supply cables (not shown). Power cables 108 include a ground wire and clamp 112 connected to a workpiece W, and a power cable 114 for supplying welding waveforms generated by the welding power supply 102 to the wire feeder 104. Control cable 110 may be configured to connect to wire feeder 104 to provide communications between the power supply 102 and the wire feeder. Such communications could also be wireless. It is understood that welding power supply 102, power cables 108, and control cable 110 can have any configuration suitable for supplying power and welding controls within the welding system 100. Although the wire feeder 104 and welding power supply 102 are shown as two separate devices interconnected by cabling, the welding power supply and wire feeder could be integrated into a single welding machine.

Further illustrated in FIG. 1, gas conduit 116 and regulator 118 are configured to connect the gas supply 106 to the wire feeder 104. The gas supply 106 may include inert gases, active gases, or a combination of both, including but not limited to argon, helium, carbon dioxide, argon and helium, argon and hydrogen, and other gas combinations. In another embodiment (not shown), the welding system 100 uses a wire electrode that includes a material that forms a gas shield when burned (e.g., flux-cored), and, therefore, a gas supply may not be necessary in all embodiments. It is understood that the gas supply may be any gas or combination of gases configured to shield a weld from the atmosphere.

As shown in FIG. 1, wire feeder 104 may include a housing 120, gear box 122, wire spool assembly 124, and user interface 126. Extending from the gear box 122 is a hose 128 that is configured to connect to a welding torch 130. The housing 120 may be connected to the user interface 126 and gear box 122. Further, the control cable 110 and power cable 114 extending from welding power supply 102, and the gas conduit 116 extending from gas supply 106, are configured to connect to housing 120, gear box 122, and hose 128. Gear box 122 includes at least a drive motor and a plurality of rollers that advance and retract a wire electrode drawn from a spool (not shown) mounted on the spool assembly 124 or drawn from a bulk package, such as a box or drum. Extending between the gear box 122 and the welding torch 130 is the hose 128. The hose 128 provides a conduit for the welding electrode and shielding gas and conducts the welding waveforms to the torch 130. The torch 130 can include a contact tip for conducting the welding waveforms from the wire feeder 104 to the wire electrode. The hose 128 can conduct a trigger signal from the torch 130 to the wire feeder 104 and to the welding power supply 102 to control feeding of the wire electrode and the provision of the welding waveforms and shielding gas to the torch. It is understood that the hose 128 and welding torch 130 may have any configuration suitable for supplying welding wire, shielding gas, and controls between the torch and wire feeder 102.

Figure 2:
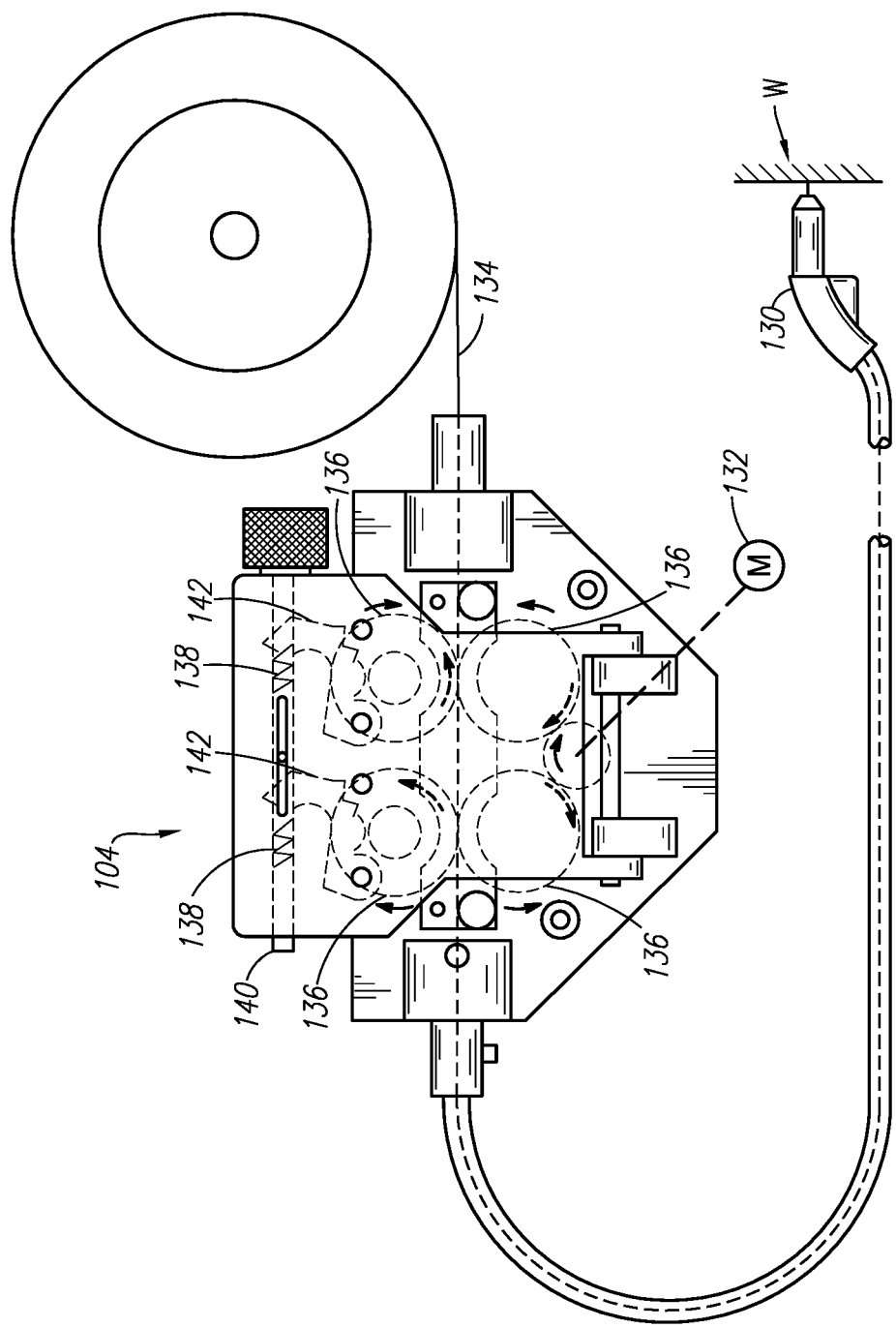
FIG. 2 shows a portion of an example wire feeder.

FIG. 2 shows a portion of the wire feeder 104, such as the gear box, in greater detail. The wire feeder 104 may include a drive assembly or drive roll assembly. A drive motor 132 or wire feeder motor delivers power, i.e. torque, to convey the wire electrode 134 through the wire feeder 104 and to the torch 130 and subsequently to the workpiece W. Drive rolls 136 are included that grip the wire electrode 134 for pushing or pulling (e.g., advancing or retracting) the wire electrode in the appropriate direction. Sets of drive rolls 136 are vertically aligned and have corresponding aligned annular or circumferential grooves through which the wire electrode 134 passes. It can be seen that the vertically-aligned sets of drive rolls 136 rotate in opposite directions to drive the wire electrode 134 through the wire feeder 104. For example, when advancing the wire electrode 134, the upper drive rolls 136 rotate clockwise and the lower drive rolls rotate counterclockwise, and when retracting the wire electrode, the upper drive rolls rotate counterclockwise and the lower drive rolls rotate clockwise. The drive rolls 136 may be cylindrical in configuration, or more specifically disk-shaped, although the particular configuration should not be construed as limiting. The surface, i.e. the outer circumference, of the drive rolls 136 may be comprised of a sufficiently hardened material, like steel, that is durable and suitable for gripping the welding wire. As shown, the drive rolls 136 may be disposed in pairs along the wire trajectory with each drive roll of the pair being supported on opposing sides of the wire electrode 134, such that respective outer circumferential portions of the drive rolls engage opposite sides of the wire (e.g., from above and below).

The wire feeder 104 can include a biasing member that biases the vertically-aligned sets of drive rolls 136 toward one another. The biasing member sets the clamping force or compression that the drive rolls 136 apply to the wire electrode 134. For example, the wire feeder 104 can include biasing springs 138 that apply a bias force to one or more drive rolls 136 to set the compression that the drive rolls apply to the wire electrode 134. In the example embodiment of FIG. 2, the biasing springs 138 are mounted to an adjusting rod 140 that can be moved inward and outward to adjust the compression of the biasing springs 138. The force of the biasing springs 138 is transferred to the upper drive rolls 136 via pivoting levers 142.

Figure 3:
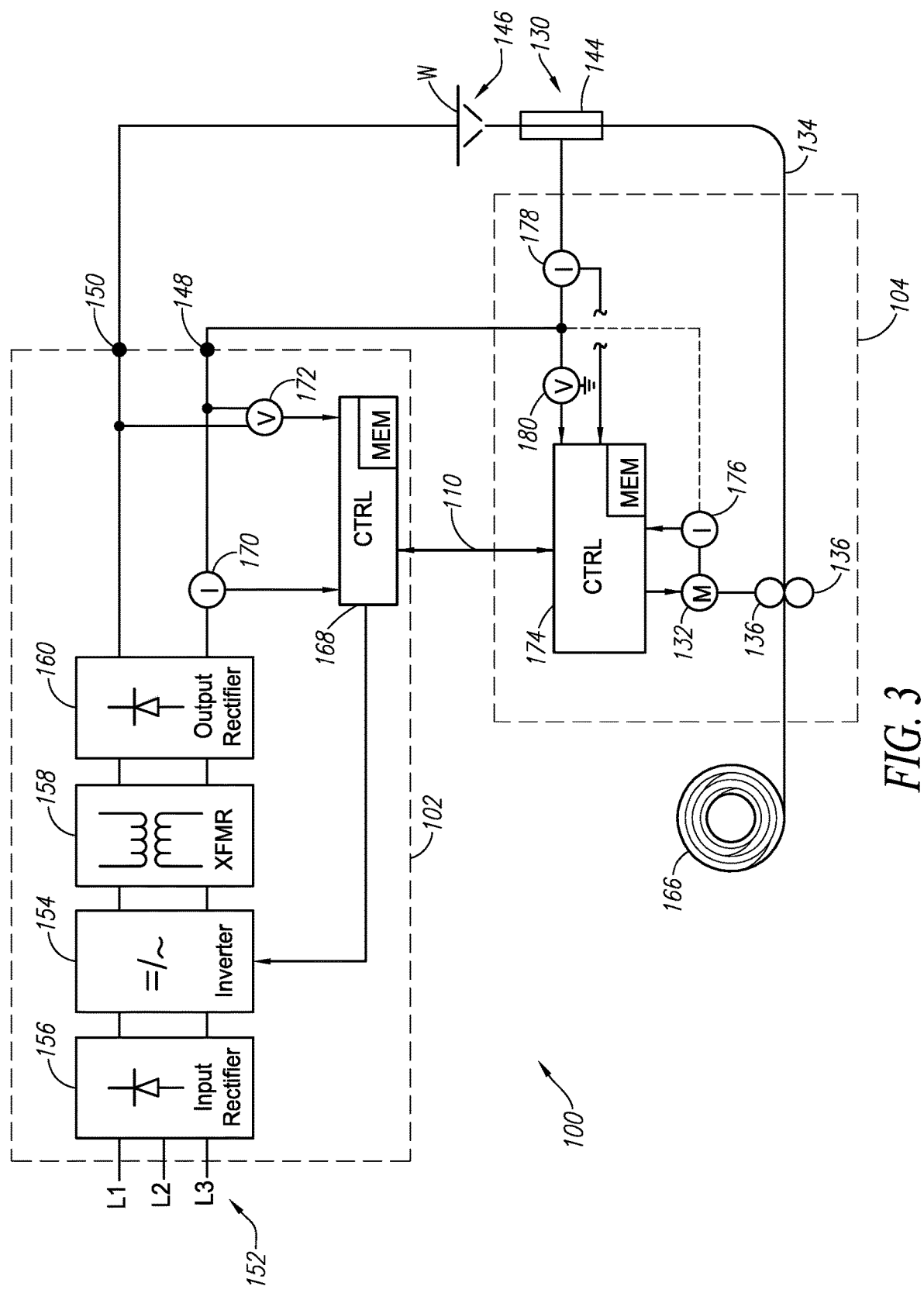
FIG. 3 is a schematic diagram of the welding system.

FIG. 3 provides a schematic diagram of the arc welding system 100. The welding power supply 102 generates a welding signal or welding waveform, which is delivered to the wire electrode 134 via a contact tip 144 in the torch 130, to generate an arc 146 between the electrode 134 and the workpiece W. The power supply 102 can include terminals or output studs 148, 150 for connecting the power cables 108 (FIG. 1) to the electrical output of the power supply.

The welding power supply 102 receives electrical energy for generating the arc 146 from a power source 152, such as a commercial power source or a generator. The power source 152 can be a single phase or three phase power source (L1, L2, L3). In certain embodiments, the arc welding system 100 can be a hybrid system that includes one or more batteries (not shown) that also supply energy to the welding power supply 102. The power supply 102 includes output circuitry for supplying the welding waveforms to the contact tip 144 and electrode 134 via the wire feeder 104. The output circuitry can include a switching type power converter such as an inverter 154 for generating the arc 146 according to a desired welding waveform. Alternatively or additionally, the welding power supply 102 could include a DC chopper (not shown) or boost converter (not shown) for generating welding waveforms. AC power from the power source 152 is rectified by an input rectifier 156. The DC output from the rectifier 156 is supplied to the inverter 154. The inverter 154 supplies high-frequency AC power to a transformer 158, and the output of the transformer is converted back to DC by an output rectifier 160.

The power supply 102 includes a controller 168 operatively connected to the output circuitry, such as to the inverter 154, for controlling the welding waveforms generated by the power supply. The controller 168 can provide a waveform control signal to the inverter 154 to control its output in order to achieve a desired welding waveform, welding voltage, welding current, etc. The waveform control signal can comprise a plurality of separate control signals for controlling the operation of various switches (e.g., transistor switches) within the inverter 154. The controller 168 monitors aspects of the welding process via feedback signals. For example, a current sensor 170, such as a current transformer (CT) or shunt, can sense the welding current level and provide a welding current feedback signal to the controller 168, and a voltage sensor 172 can sense the welding voltage level and provide a welding voltage feedback signal to the controller. The controller 168 can monitor the welding current level and welding voltage level from the sensors 170, 172 during the welding operation.

The power supply 102 is operatively connected to the wire feeder 104, and the wire feeder conducts the welding waveforms to the torch 130 and wire electrode 134 to generate the arc 146 and perform the deposition operation (e.g., welding, additive manufacturing, hardfacing, etc.) The torch 130 can be connected to the wire feeder 104 as shown in FIG. 1, or, in embodiments in which the power supply and wire feeder are part of a common device, the torch 130 can be directly connected to the power supply 102.

The electrode 134 can be a solid, flux-cored or metal-cored consumable wire welding electrode. The electrode 134 is fed from a welding wire source 166 by the wire feeder 104, which advances the electrode toward a weld puddle during the deposition operation. The wire feeder 104 can configured for bidirectional operation. For example, the drive motor 132 in the wire feeder 104 can both advance and retract the wire electrode 134. To control the operations of the drive motor 132, such as starting and stopping, the wire feed speed, and rotation direction (wire advance and retract), the wire feeder 104 can include a controller 174 that is operatively connected to the drive motor.

The controller 174 in the wire feeder 104 and the controller 168 in the power supply 102 can communicate with each other, such as over control cable 110, to exchange information about the welding process (e.g., parameter settings, welding voltage and current levels, torch trigger state, wire feeder drive motor current level, etc.) In embodiments in which the power supply 102 and wire feeder 104 are part of a common device, the power supply controller 168 and the wire feeder controller 174 can be combined into a single controller or their respective control functions can be distributed among multiple controllers. The controllers 168, 174 can be electronic controllers and may include processors. The controllers 168, 174 can include one or more of a microprocessor, a microcontroller, a digital signal processor (DSP), an application specific integrated circuit (ASIC), a field-programmable gate array (FPGA), discrete logic circuitry, or the like. The controllers 168, 174 can include memory portions (e.g., RAM or ROM) storing program instructions that cause the controllers to provide the functionality ascribed to it herein. The controllers 168, 174 can include a plurality of physically separate circuits or electronic devices, such as processors in combination with separate comparators, logic circuits, etc. However, for ease of explanation, the controllers 168, 174 are shown as monolithic devices. Because the controllers 168, 174 can communicate with each other, functionality described herein as being performed by the controller 168 in the power supply 102 can be performed by the controller 174 in the wire feeder 104, and vice versa. The functionality can also be distributed or shared between the controllers 168, 174.

The wire feeder 104 includes a motor current sensor 176 that senses the current level of the wire feeder's drive motor 132. The controller 174 is operatively connected to the motor current sensor 176 to receive a current level signal therefrom, so that the controller can monitor the current level of the drive motor. In certain embodiments, the wire feeder 104 can include a current sensor 178 and a voltage sensor 180 to allow the controller 174 to monitor the welding current and voltage levels. Welding current level and welding voltage level could also be communicated to the wire feeder 104 by the power supply 102 in real-time.

Figure 4:
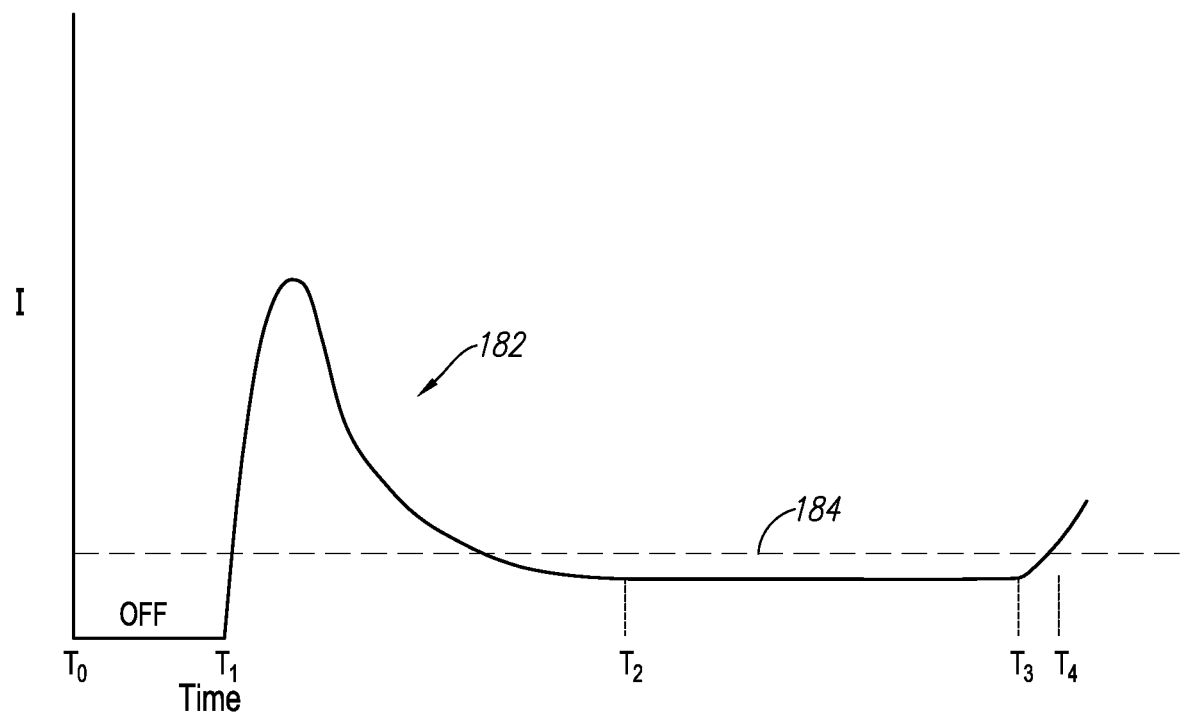
FIG. 4 is a graph of wire feeder drive motor current.

By monitoring the current level of the wire feeder drive motor 132, the controller 174 can detect contact events between the wire electrode 134 and other objects. FIG. 4 shows an example graph of the current level 182 of the wire feeder drive motor 132 over a time duration that includes a contact event. Between times $T_0$ and $T_1$, the drive motor is off and the current level is 0 A. The drive motor is activated at $T_1$ and the current level rises quickly and then drops between $T_1$ and $T_2$ due to the inrush current upon starting. Between times $T_2$ and $T_3$, the drive motor is in a steady state as it advances the wire electrode through the hose/torch. A contact event between the wire electrode and an object occurs at time $T_3$, and it can be seen that the current level rises as the drive motor torque increases to maintain the wire feed speed. The current level rise can be detected by the controller 174 to recognize the contact event. The controller 174 can store a threshold value 184 for the dive motor current level that is indicative of the contact event. When the current level of the drive motor meets or exceeds the threshold value 184, the controller can determine that a contact event has occurred. In FIG. 4, the current level of the drive motor meets and then exceeds the threshold value 184 at time $T_4$, and the controller 174 would detect the contact event at time $T_4$. The threshold value 184 can be fixed or can be determined by the controller 174 based on one or more welding parameters, such as the wire feed speed, the size (e.g., diameter) of the wire electrode, the type of wire electrode, the welding process, the welding current, etc. The threshold value 184 is selected to account for typical torque/current fluctuations as the wire electrode is driven. The threshold value 184 can be determined based on user input or other data and the use of look-up tables, etc. However, in some applications this may not be optimal as the specific user configuration of the welding system may not reflect the data in the look-up tables, etc. For example, the distance between the wire feeder and the welding operation can be quite long, creating the need for higher torque/drive motor current to achieve a desired wire feed speed. In such embodiments, the controller 174 can use empirical operational data to determine the normal steady-state current level and the threshold value (e.g., based on the empirically-determined steady-state current level). The controller 174 can also monitor the rate of change of the drive motor current (e.g., calculate the first derivative) and compare the rate of change to a threshold value to determine whether a contact event has occurred. To account for the inrush current at starting, the controller 174 can employ a time delay before detecting contact events. The time delay can be established similarly to the threshold value 184. For example, the time delay can be predetermined, determined empirically, determined from user input data, etc. The time delay could also be implemented by the controller 174 monitoring the drive motor current level and determining when the inrush has ended, such as by dropping below the threshold value 184 or leveling to a generally steady state.

With reference to FIGS. 3 and 4, when a contact event is detected, the controller 174 can discriminate contact events with objects electrically connected to the welding power supply 102 (e.g., workpiece W) from contact events with objects electrically insulated from the welding power supply (e.g., a non-workpiece object). Some contact between the wire electrode 134 and the workpiece W or weld puddle is acceptable during welding, and the controller 174 need not stop feeding the wire electrode or retract the electrode if a contact with the workpiece W is detected. However, if a contact event with a non-workpiece object is detected, the controller 174 will automatically stop advancement of the wire electrode. This could be done by deactivating the drive motor 132 or by reversing the drive motor and retracting the wire electrode 134. The retracting speed of the drive motor 132 can be the same as the forward wire feed speed, or it could be different. For example, it may be desirable to retract the wire electrode at a high speed when a contact with a non-workpiece object is detected.

The controller 174 can distinguish contact events between the wire electrode 134 and the workpiece W from contact events involving non-workpiece objects by analyzing the welding voltage and/or current levels. The welding voltage and current levels can be monitored at the welding power supply 102 and transmitted to the wire feeder 104, or they can be sensed at the wire feeder. If the wire electrode 134 contacts the workpiece W, the welding voltage will drop due to the short circuit, and current flow through the welding electrode and workpiece. The presence of these conditions in combination with a rise in the drive motor 132 current level indicates that the wire electrode 134 has contacted the workpiece W. However, if the wire electrode 134 contacts a non-workpiece object that is electrically insulated from the power supply 102, such as a portion of an operator's welding glove or a part of his body, the welding circuit will be open and no welding current will flow and the welding voltage will not drop. Thus, a signature rise in the drive motor 132 current level or its rate of change, in combination with an open circuit welding voltage level and no welding current flow, is indicative of a contact event with a non-workpiece object that is insulated from the power supply 102. The controller 174 can discriminate contact events with objects electrically connected to the welding power supply 102 from contact events with objects electrically insulated from the welding power supply based on one or both of the welding current level and the welding voltage level.

In certain embodiments, the welding power supply or the wire feeder can superimpose a signal, such as a high frequency signal (e.g., greater than 50 kHz) onto the welding circuit. During normal operation, the signal is transmitted through the welding circuit and workpiece and can be detected by the power supply or wire feeder. If the signal is detected in combination with a rise in wire feeder drive motor current, then the wire electrode has contacted the workpiece or something electrically connected to the welding power supply (e.g., a welding table, grounding clamp, etc.) If the signal is not detected but a rise in wire feeder drive motor current is observed, then the wire electrode has contacted an object that is electrically insulated from the welding power supply, such as the operator's clothing. Detecting/not detecting a signal added to the welding circuit can be used alone or in combination with monitoring the welding voltage and current levels to determine contact events between the wire electrode and non-workpiece objects. Circuitry for adding and detecting high frequency signals in a welding circuit are known and need not be described in detail. However, such signals have been used previously to enable the welding power supply (e.g., to activate the welding waveforms) and have not been used to discriminate wire electrode contact events with objects electrically connected to the welding power supply from wire electrode contact events with objects electrically insulated from the welding power supply.

Figure 5:
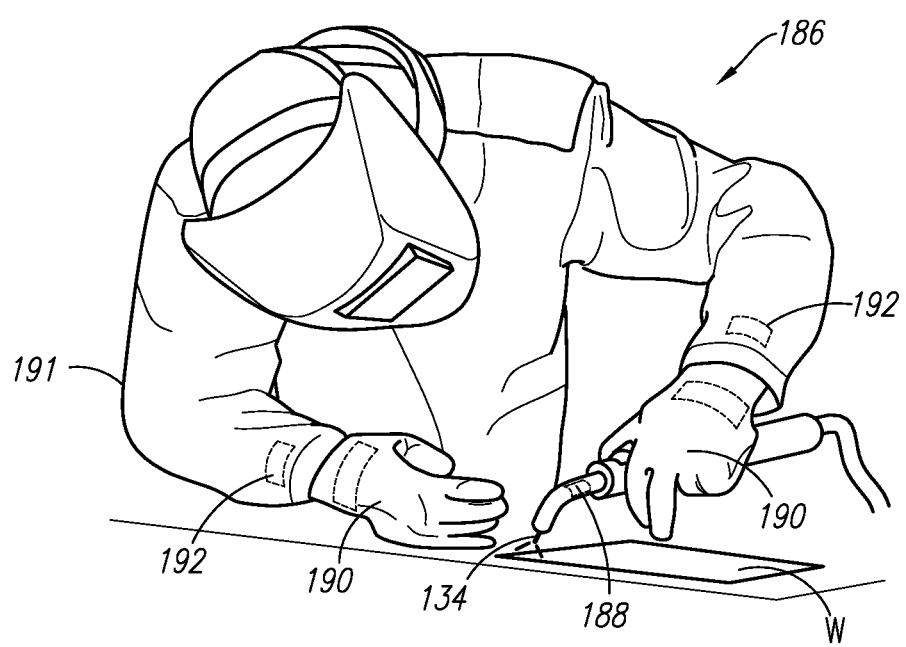
FIG. 5 shows an operator performing a welding operation.

The detection of contact events between the wire electrode and non-workpiece objects could be enhanced by the addition of one or more accelerometers in the welding torch. FIG. 5 shows an operator 186 performing a welding operation. The torch 130 held by the operator includes an accelerometer 188. The accelerometer 188 provides a signal to the controller in the wire feeder and/or welding power supply. If the wire electrode 134 contacts a non-workpiece object, for example if the wire electrode sticks the operator, the operator 186 may react by jerking the torch 130. This quick movement of the torch 130 can be reflected in the signal generated by the accelerometer 188 and used by the welding system to trigger a retraction of the wire electrode. The signal from the accelerometer in combination with the drive motor current level of the wire feeder can be used to detect contact events with a non-workpiece object. These signals can also be used in combination with the welding voltage and current levels to determine contact events with non-workpiece objects.

In certain embodiments, the operator's clothing, such as welding gloves 190 or welding jacket 192, can generate signals that are detectable by the controller in the wire feeder and/or welding power supply, for use in determining a contact event between the article of clothing and the wire electrode 134. For example, the gloves 190 or jacket 192 can include sensors 192 for detecting the contact events and generating contact event signals that are transmitted to the controller. Example sensors 192 include capacitive sensors, voltage sensors, electric field sensors, etc. The gloves 190 or jacket 191 could also apply a signal to the wire electrode 134 when a contact event occurs, and the controller could detect the signal on the electrode and recognize the existence of a contact event. For example, the gloves 190 or jacket 191 could detect the contact event and then apply the signal to the wire electrode 134, or the gloves/jacket could include an active signal generation circuit that applies a detectable signal to the wire electrode whenever a contact event occurs but without the clothing items themselves detecting the contact event. The gloves 190 or jacket 191 could communicate a detected contact event to the controller in the wire feeder or power supply in various ways, such as via a wired communication cable or wirelessly or through the torch. Other example types of operator clothing that can employ the sensors 192 or other signal generation circuits include welding shirts, aprons, cape sleeves, pants, etc. The circuitry for detecting contact events and/or generating signals that indicate contact events can be embedded within the articles of clothing so that some penetration of the article of clothing by the wire electrode is required before a contact event signal is transmitted to the controller in the welding system.

Figure 6:
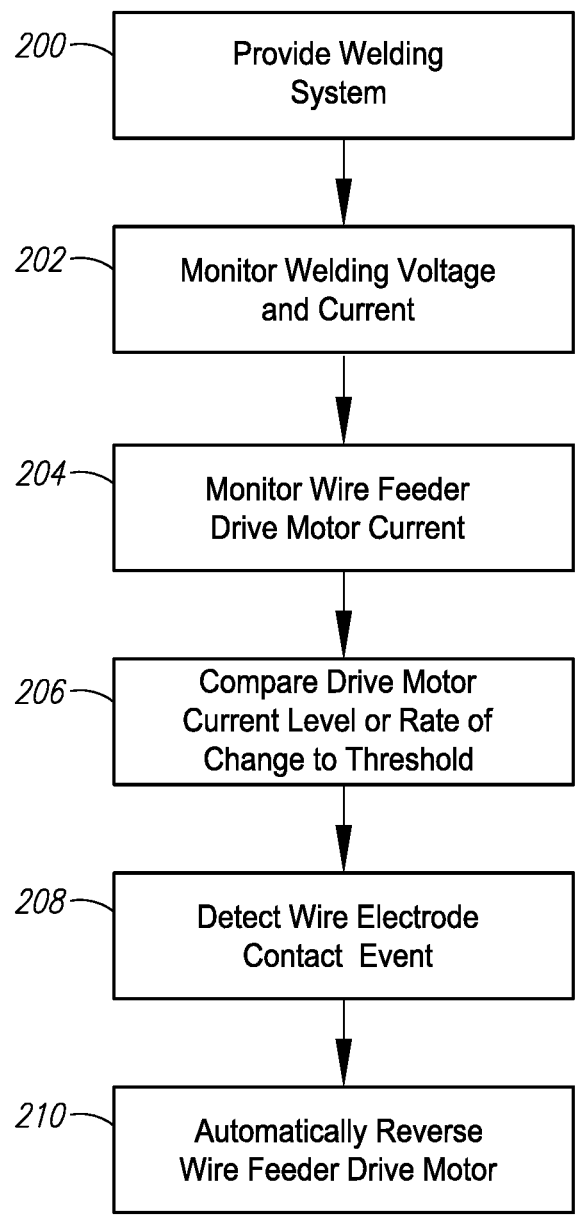
FIG. 6 is a flow diagram of an example welding method.

FIG. 6 provides a flow diagram of an example welding method performed by a welding system. The welding system, such as a system described above, is provided in step 200. The welding operation is initiated, such as by activation of a trigger on a welding torch, and the welding electrode is driven by the wire feeder of the welding system through the torch. The welding voltage and current levels are monitored by the power supply or wire feeder (step 202). The motor current level of the drive motor in the wire feeder is also monitored (step 204). A controller in either the power supply or the wire feeder compares the drive motor current level or the rate of change of the drive motor current level to a threshold value (step 206), and then detects a wire electrode contact event based on the comparison, and also based on the welding current level or welding voltage level (step 208). The controller further discriminates wire electrode contact events with objects electrically connected to the welding power supply from wire electrode contact events with objects electrically insulated from the welding power supply. If the wire electrode has contacted an object electrically insulated from the welding power supply (e.g., a non-workpiece object), the wire feeder drive motor is automatically reversed (step 210) to retract the wire electrode.

Figure 7:
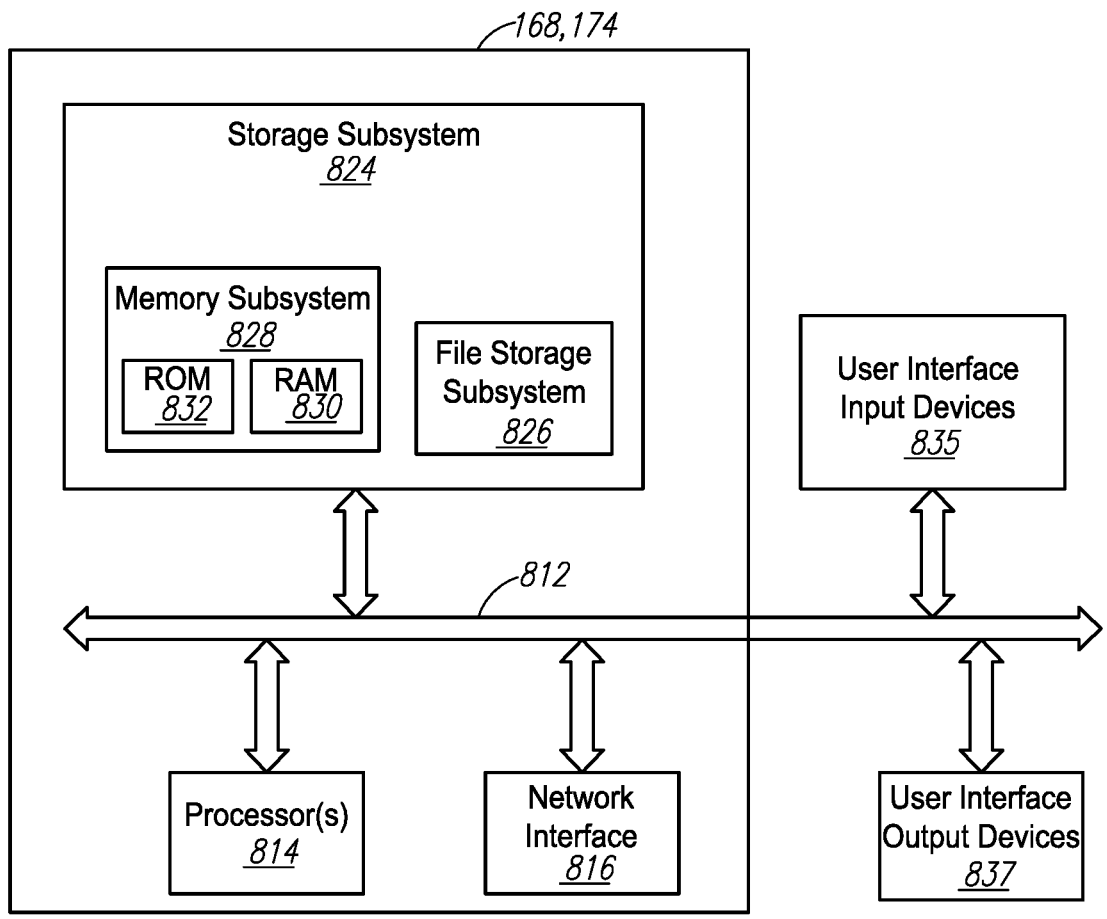
FIG. 7 shows an example controller.

FIG. 7 illustrates an embodiment of an example controller, such as the controller 168 in the welding power supply or the controller 174 in the wire feeder. The controller 168, 174 includes at least one processor 814 which communicates with a number of peripheral devices via bus subsystem 812. These peripheral devices may include a storage subsystem 824, including, for example, a memory subsystem 828 and a file storage subsystem 826, user interface input devices 835, user interface output devices 837, and a network interface subsystem 816. The input and output devices allow user interaction with the controller 168, 174. Network interface subsystem 816 provides an interface to outside networks and is coupled to corresponding interface devices in other computer systems.

User interface input devices 835 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 168, 174 or onto a communication network.

User interface output devices 837 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 168, 174 to the user or to another machine or computer system.

Storage subsystem 824 provides a non-transitory, computer-readable storage medium that stores programming and data constructs that provide the functionality of some or all of the modules described herein. These software modules are generally executed by processor 814 alone or in combination with other processors. Memory 828 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include solid state memory, a hard disk drive, a floppy disk drive along with associated removable media, a CD-ROM drive, an optical drive, flash memory, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 168, 174 communicate with each other as intended. Although bus subsystem 812 is shown schematically as a single bus, alternative embodiments of the bus subsystem may use multiple buses.

The controller 168, 174 can be of varying types of data processing systems, and due to the ever-changing nature of computing devices and networks, the description of the controller 168, 174 depicted in FIG. 7 is intended only as an example for purposes of illustrating some embodiments. Many other configurations of the controller 168, 174 are possible having more or fewer components than the controller depicted in FIG. 7.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding system, comprising:
a welding power supply configured to generate a welding waveform;
a wire feeder operatively connected to the welding power supply to conduct the welding waveform to a wire electrode,
wherein the wire feeder comprises:
a drive motor that drives the wire electrode bidirectionally;
a motor current sensor that senses a current level of the drive motor; and
a controller operatively connected to the motor current sensor to receive a current level signal from the motor current sensor, and operatively connected to the drive motor to control operations of the drive motor;
a welding current sensor that senses a welding current level, wherein the welding current sensor is located with the welding power supply or the wire feeder; and
a welding voltage sensor that senses a welding voltage level, wherein the welding voltage sensor is located with the welding power supply or the wire feeder,
wherein the controller is configured to determine a contact event between the wire electrode and a non-workpiece object that is electrically insulated from the welding power supply based on the current level signal from the motor current sensor and one or both of the welding current level and the welding voltage level, and automatically retract the wire electrode upon determining the contact event between the wire electrode and the non-workpiece object.

2. The welding system of claim 1, wherein the controller automatically retracts the wire electrode upon the current level of the drive motor meeting or exceeding a threshold value.

3. The welding system of claim 2, wherein the threshold value is determined by the controller based on a wire feed speed or a size of the wire electrode.

4. The welding system of claim 1, wherein the controller automatically retracts the wire electrode upon a rate of change of the current level of the drive motor meeting or exceeding a threshold value.

5. A welding system, comprising:
a welding power supply configured to generate a welding waveform;
a wire feeder operatively connected to the welding power supply to conduct the welding waveform to a wire electrode in a welding circuit,
wherein the wire feeder comprises:
a drive motor that advances the wire electrode through a torch;
a motor current sensor that senses a current level of the drive motor; and
a controller operatively connected to the motor current sensor to receive a current level signal from the motor current sensor, and operatively connected to the drive motor to control operations of the drive motor; and a further sensor that senses a condition of the welding circuit, wherein the further sensor is located with the welding power supply or the wire feeder, wherein the controller is configured to discriminate wire electrode contact events with objects electrically connected to the welding power supply from wire electrode contact events with objects electrically insulated from the welding power supply based on the current level signal from the motor current sensor and the sensed condition of the welding circuit, and automatically stop advancement of the wire electrode through the torch upon detecting a wire electrode contact event with an object electrically insulated from the welding power supply.

6. The welding system of claim 5, wherein the controller automatically stops the advancement of the wire electrode through the torch upon detecting said wire electrode contact event with the object electrically insulated from the welding power supply by reversing the drive motor and retracting the wire electrode.

7. The welding system of claim 6, wherein the controller retracts the wire electrode upon the current level of the drive motor meeting or exceeding a threshold value.

8. The welding system of claim 7, wherein the threshold value is determined by the controller based on a wire feed speed or a size of the wire electrode.

9. The welding system of claim 6, wherein the controller retracts the wire electrode upon a rate of change of the current level of the drive motor meeting or exceeding a threshold value.

10. The welding system of claim 5, wherein the further sensor includes a voltage sensor.

11. The welding system of claim 5, wherein the further sensor includes a current sensor.

12. A welding method, comprising the steps of:
providing a welding system comprising:
a welding power supply configured to generate a welding waveform;
a wire feeder operatively connected to the welding power supply to conduct the welding waveform to a wire electrode, wherein the wire feeder includes a drive motor that drives the wire electrode bidirectionally, and a motor current sensor that senses a current level of the drive motor;
a welding current sensor that senses a welding current level; and a welding voltage sensor that senses a welding voltage level;

detecting a contact event between the wire electrode and a non-workpiece object that is electrically insulated from the welding power supply based on the current level signal from the motor current sensor and one or both of the welding current level and the welding voltage level; and automatically reversing the drive motor and retracting the wire electrode upon detecting the contact event between the wire electrode and the non-workpiece object.

13. The method of claim 12, wherein the step of detecting the contact event includes comparing the current level of the drive motor to a threshold value.

14. The method of claim 13, wherein the threshold value is determined based on a wire feed speed or a size of the wire electrode.

15. The method of claim 12, wherein the step of detecting the contact event includes comparing a rate of change of the current level of the drive motor to a threshold value.

16. A welding system, comprising:
a welding power supply configured to generate a welding waveform;
a wire feeder operatively connected to the welding power supply to conduct the welding waveform to a wire electrode, wherein the wire feeder comprises a drive motor that advances the wire electrode through a torch;
a controller operatively connected to the drive motor to control operations of the drive motor; and
an article of clothing comprising a sensor that generates a signal detectable by the controller,
wherein the controller is configured to determine a contact event between the wire electrode and the article of clothing based on said signal, and automatically stop advancement of the wire electrode through the torch upon determining the contact event between the wire electrode and the article of clothing.

17. The welding system of claim 16, wherein the article of clothing is a welding glove.

18. The welding system of claim 17, wherein the controller automatically stops the advancement of the wire electrode through the torch upon determining the contact event between the wire electrode and the welding glove by reversing the drive motor and retracting the wire electrode.

19. The welding system of claim 17, wherein the controller receives the signal over the wire electrode.

* * * * *